(12) United States Patent
Nallaperumal

(10) Patent No.: US 12,320,181 B2
(45) Date of Patent: Jun. 3, 2025

(54) AGENT SAFETY APPARATUS AND METHOD

(71) Applicant: HONEYWELL INTERNATIONAL INC., Charlotte, NC (US)

(72) Inventor: Pirammanayagam Nallaperumal, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 762 days.

(21) Appl. No.: 17/253,354

(22) PCT Filed: Sep. 23, 2019

(86) PCT No.: PCT/US2019/052353
§ 371 (c)(1),
(2) Date: Dec. 17, 2020

(87) PCT Pub. No.: WO2020/101805
PCT Pub. Date: May 22, 2020

(65) Prior Publication Data
US 2021/0262277 A1    Aug. 26, 2021

(30) Foreign Application Priority Data

Nov. 16, 2018  (IN) .............................. 201811043147

(51) Int. Cl.
*E05G 1/10*    (2006.01)
*G07C 9/00*    (2020.01)
(Continued)

(52) U.S. Cl.
CPC ........... *E05G 1/10* (2013.01); *G07C 9/00309* (2013.01); *G07C 9/00896* (2013.01); *G08B 7/06* (2013.01);
(Continued)

(58) Field of Classification Search
CPC .. E05G 1/10; H04W 4/80; G07C 9/00; G07C 9/00309; G07C 9/00896;
(Continued)

(56) References Cited

U.S. PATENT DOCUMENTS 5,831,515 A    11/1998   Stewart et al.
6,980,105 B2   12/2005   Hodgen
(Continued)

FOREIGN PATENT DOCUMENTS

CN    205451393        8/2016
CN    106297185 A      1/2017
(Continued)

OTHER PUBLICATIONS

International Search and Written Opinion for PCT Application No. PCT/US2019/052353 dated Dec. 5, 2019.
(Continued)

*Primary Examiner* — Suzanne L Barrett
(74) *Attorney, Agent, or Firm* — Seager, Tufte & Wickhem, LLP

(57) ABSTRACT

A lockbox security system includes a lockbox that has a lockable compartment. The lockbox includes a wireless communications device and a stored program configured to provide access to the lockable compartment in response to a wireless signal. A security device includes a wireless security communication device and a stored distress program configured to activate an alert upon receipt of a distress signal.

25 Claims, 4 Drawing Sheets

(51) Int. Cl.
　　　*G08B 7/06* 　　　　(2006.01)
　　　*H04W 4/80* 　　　　(2018.01)
(52) U.S. Cl.
　　　CPC .... *H04W 4/80* (2018.02); *G07C 2009/00539* (2013.01); *G07C 2009/00936* (2013.01)
(58) Field of Classification Search
　　　CPC ........... G07C 2009/00539; G07C 2009/00936; G08B 7/06; Y10T 70/5031
　　　USPC .................................................. 70/63; 109/38
　　　See application file for complete search history.

(56) References Cited

U.S. PATENT DOCUMENTS

| | | | |
|---|---|---|---|
| 7,081,813 | B2 | 7/2006 | Winick et al. |
| 8,441,352 | B2 | 5/2013 | Sizemore |
| 8,963,705 | B2 | 2/2015 | Miller et al. |
| 9,615,235 | B2 | 4/2017 | Scully et al. |
| 9,697,719 | B2 * | 7/2017 | Trumphy .............. G08B 25/009 |
| 2004/0049406 | A1 | 3/2004 | Muncaster et al. |
| 2008/0169922 | A1 | 7/2008 | Issokson |
| 2010/0176919 | A1 | 7/2010 | Myers et al. |
| 2013/0237174 | A1 | 9/2013 | Gusikhin et al. |
| 2013/0257612 | A1 * | 10/2013 | Finet ........................ A62B 1/04 340/539.11 |
| 2017/0372550 | A1 | 12/2017 | Lin |
| 2018/0204445 | A1 | 7/2018 | Bereshchanskiy et al. |
| 2023/0042956 | A1 * | 2/2023 | Carter ................ G06Q 10/0836 |
| 2023/0184007 | A1 * | 6/2023 | Fisher ................ G07C 9/00896 70/63 |

FOREIGN PATENT DOCUMENTS

| | | |
|---|---|---|
| WO | 2013141830 | 9/2013 |
| WO | 2015040074 | 3/2015 |

OTHER PUBLICATIONS

Smart Door Lock System: Improving Home Security using Bluetooth Technology. Available at:https://www.ijcaonline.org/archives/volume160/number8/dabhade-2017-ijca-913058.pdf Feb. 2017.
Review of Various Functions Controlling of Vehicle by using Mobile Bluetooth. Available at: http://www.ijctee.org/NSPIRE2013/IJCTEE_0313_Special_Issue_12.pdf Mar.-Apr. 2013.

* cited by examiner

AGENT SAFETY APPARATUS AND METHOD

CROSS-REFERENCE TO RELATED APPLICATIONS

This application claims priority to Indian Provisional Application No. 201811043147, which was filed on Nov. 16, 2018 and is incorporated herein by reference.

BACKGROUND

This application relates to key control security systems and methods, particularly those that include a lockbox located near a premises to which controlled access is to be permitted under specified conditions, and other related security applications.

A lockbox, sometimes referred to as a "keybox," has a locked compartment within which a key to a conventional lock or other physical access device or asset can be stored. In typical uses, the lockbox is positioned near a premises to which controlled access is desired, e.g., a home or other dwelling, a commercial building or site, or virtually any other type of premises, and a conventional key to open a lock securing the premises is stored within the locked compartment. Lockboxes are widely used by real estate agents to facilitate the showing of listed properties. Lockboxes are also used in commercial and industrial settings to facilitate access to secured premises, particularly when the premises are otherwise unattended, such as in the case of accesses that take place after hours or at many geographically dispersed locations.

The lockboxes of primary interest here have electronically or electrically actuated locks that are capable of receiving unlocking signals transmitted wirelessly. Such lockboxes may have, e.g., a receiver for an infrared, radio or other type of wireless signal. The unlocking signals are sent by access devices, sometimes referred to as electronic keys.

A person can use an access device to transmit a request to access a premises that is secured by a lockbox. In general terms, the system determines whether the user's access request is to be granted, and, if so, enables the user to unlock the lockbox and access its contents. In a typical scenario, the lockbox contains a conventional key to the locked premises and the user uses the key stored in the lockbox to unlock the premises and gain physical access to it. However, because the premises are generally empty and/or without dedicated security system, the safety of the person can be of concern.

SUMMARY

In one exemplary embodiment, a lockbox security system includes a lockbox that has a lockable compartment. The lockbox includes a wireless communications device and a stored program configured to provide access to the lockable compartment in response to a wireless signal. A security device includes a wireless security communication device and a stored distress program configured to activate an alert upon receipt of a distress signal.

In a further embodiment of any of the above, the wireless communications device includes at least one of a cellular communicator or a Bluetooth communicator.

In a further embodiment of any of the above, the wireless security communication device includes at least one of a cellular communicator or a Bluetooth communicator.

In a further embodiment of any of the above, the security device is configured to interface with a vehicle.

In a further embodiment of any of the above, the security device includes an on-board diagnostic (OBD) port compatible connector.

In a further embodiment of any of the above, the security device is configured to activate at least one of a vehicle horn or a vehicle light.

In a further embodiment of any of the above, the security device is remote from the lockbox.

In a further embodiment of any of the above, the security device includes at least one of an audible alarm or a visual alarm.

In a further embodiment of any of the above, the security device includes a lockable attachment for securing the security device.

In a further embodiment of any of the above, a mobile device is configured to wirelessly communicate with the lockbox and the security device.

In another exemplary embodiment, a method of operating a lockbox security system includes the steps of wirelessly communicating access to a lockbox from a mobile device and activating a security device upon granting access to the lockbox. A distress signal is communicated from the mobile device wirelessly to the security device. The security device activates an alarm upon receipt of the distress signal.

In a further embodiment of any of the above, wirelessly communicating access to the lockbox from the mobile device is performed through at least one of a cellular connection or a Bluetooth connection.

In a further embodiment of any of the above, the distress signal is sent from the mobile device to the security device through at least one of a cellular connection or a Bluetooth connection.

In a further embodiment of any of the above, the security device is remote from the lockbox.

In a further embodiment of any of the above, the alarm includes at least one of an audible alarm or a visual indicator.

In a further embodiment of any of the above, the security device is in direct electrical communication with a vehicle.

In a further embodiment of any of the above, the alarm includes at least one of a vehicle horn or a vehicle light.

In a further embodiment of any of the above, the mobile device sends the distress signal in response to one of a predetermined movement of the mobile device or a predetermined audio input recognized by the mobile device.

In a further embodiment of any of the above, the predetermined movement of the mobile device is identified through accelerometer data from the mobile device. The predetermined audio input is identified through audio data from the mobile device.

In a further embodiment of any of the above, the mobile device sends the distress signal in response to a user sending a distress signal from the mobile device.

DETAILED DESCRIPTION

This disclosure describes a system and method of controlling access for a user to a key to a locked premises as well as providing additional security for the user accessing the locked premises. The system uses an audible and/or visual indicator that alerts others in the vicinity of the premises if the user encountered a situation that places the user in distress, such as a robbery or another person entering the premises without permission.

Figure 1:
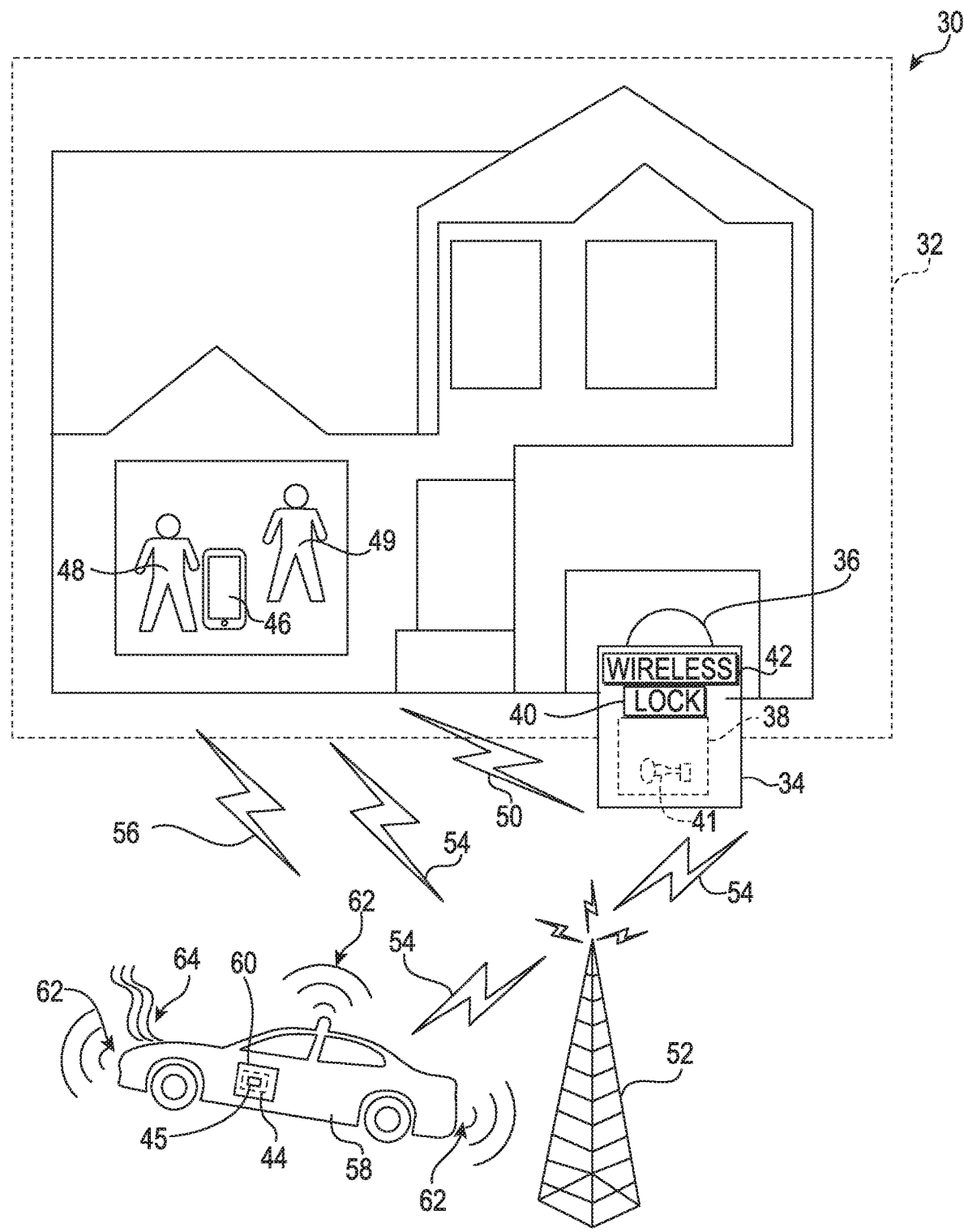
FIG. 1 illustrates an example lockbox security system.

FIG. 1 illustrates a non-limiting example of a lockbox security system 30 associated with a premises 32, however, the lockbox security system 30 could be associated with multiple premises 32. The lockbox security system 30 includes a lockbox 34 and a security device 44 that is located remote from the lockbox 34. A mobile device 46 is associated with a user 48, such as a real estate agent, and is in wireless communication with the lockbox 34 and the security device 44.

In the illustrated example of FIG. 1, the lockbox 34 is fixed relative to the premises 32 through a lockable attachment 36. The lockbox 34 also includes a locked compartment 38 for storing a key 41 capable of granting access to the premises 32. A locking mechanism 40 is in electrical communication with a wireless communication device 42. The wireless communication device 42 includes a microprocessor and memory for storing and running a program capable of selectively granting access to the locked compartment 38 once an authenticated request for access to the lockbox 34 has been granted.

The connection between the wireless communication device 42 and the mobile device 46 can be a direct wireless connection 50, such as through forming a Bluetooth connection between the mobile device 46 and the lockbox 34. Alternatively, the wireless communication device 42 connects with the mobile device 46 through a network connection, such as a cellular network. When a network connection is used for communication, the wireless communication device 42 and the mobile device 46 communicate through a wireless service network 52 via wireless connections 54.

The connection between the mobile device 46 and the security device 44 can also be a direct wireless connection 56, such as through forming a Bluetooth connection between the mobile device 46 and the security device 44. Alternatively, the mobile device 46 connects with the security device 44 through a network connection, such as a cellular network. When the network connection is used for communication, the security device 44 communicates through the wireless service network 52 via the wireless connections 54.

In the illustrated example of FIG. 1, the security device 44 is in direct electrical communication with a vehicle 58, such as an automobile, through a connector interfacing with an on-board diagnostic (OBD) port 60 in the vehicle 58. The security device 44 includes a microprocessor and memory capable of storing and running a distress program. The distress program is capable of triggering at least one visual indicator 62 and/or at least one audible indicator 64 on the vehicle 58 when the security device 44 receives a distress signal from the mobile device 46. The visual indicators 62 can include at least one of headlights, taillight, or flashing lights and the audible indicator 64 can include at least one of a vehicle horn or a siren.

Figure 2:
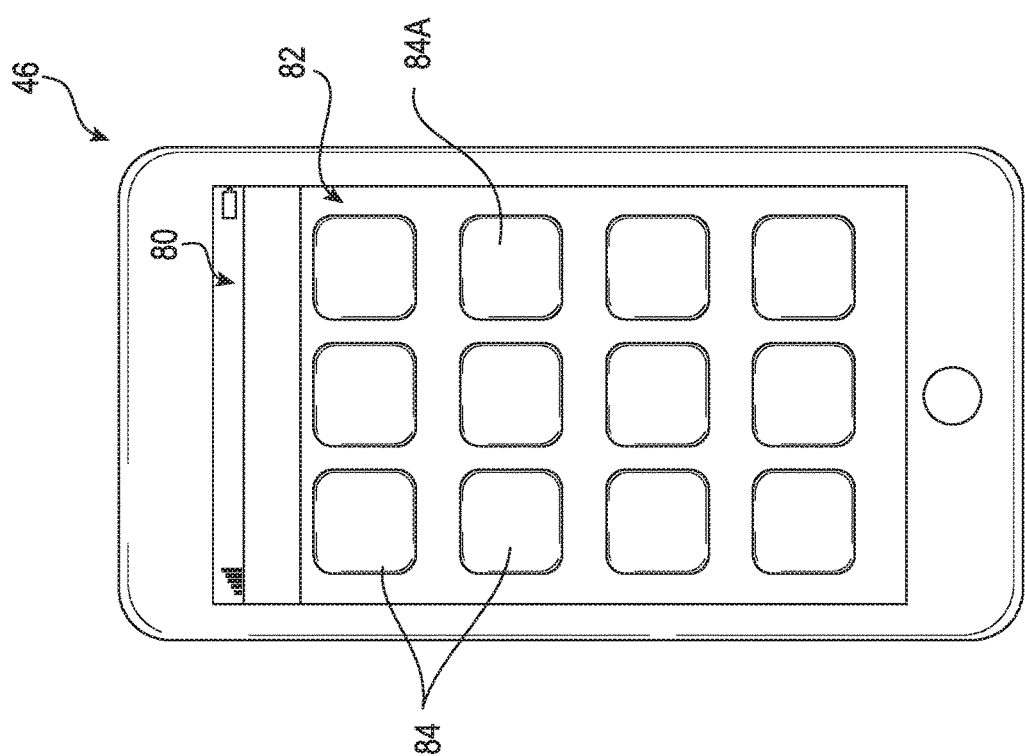
FIG. 2 illustrates an example mobile device.

The lockbox security system 30 may be launched and/or controlled from an application (See FIGS. 2 and 3) stored in memory on the mobile device 46. FIG. 2 shows a user interface 80 on a home screen 82 of the mobile device 46. In the illustrated example, the home screen 82 includes multiple applications 84 that may be launched on the mobile device 46 such as via an icon, tile, button, or the like. For ease of reference, the term "button" will collectively reference such user interface options.

Figure 3:
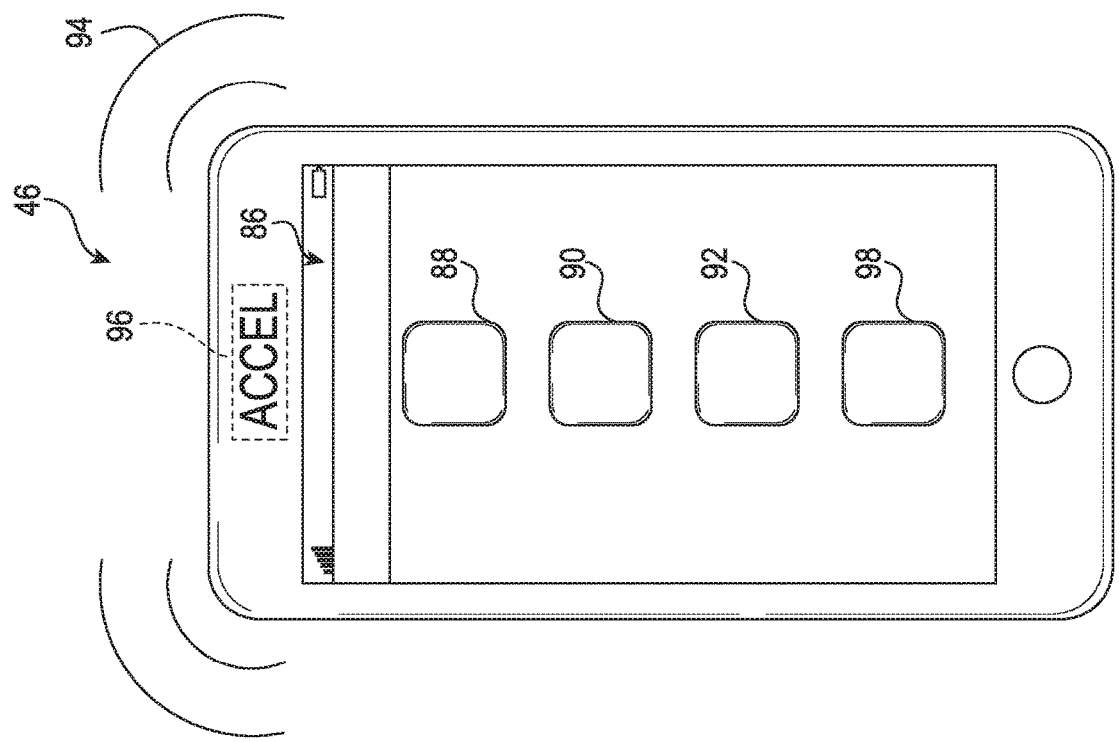
FIG. 3 illustrates a user interface for an application for controlling the lockbox security system.

Upon selecting a button that corresponds to an application 84A for the lockbox security system 30, a user interface 86 will appear on the mobile device 46 as shown in FIG. 3. In the illustrated example, the user interface 86 in the application 84A for the lockbox security system 30 will appear and include an access button 88 that upon authentication will grant access to the locked compartment 38 in the lockbox 34 for the user 48. Additionally, launching the application 84A for the lockbox security system 30 can arm the security device 44. Alternatively, the user interface 86 includes an arming button 90 that arms the security device 44 manually.

Arming the security device 44 allows the security device 44 to trigger the visual and/or audible indicators 62 and 64 upon receiving a distress signal from the mobile device 46 through either the direct wireless connection 56 or the network wireless connection 54. The distress signal can indicate that the user 48 has encountered an unwanted person 49 on the premises 32, such as in a robbery situation, or is otherwise in need of immediate assistance. The user 48 can trigger the distress signal and the accompanying the visual and/or audible indicators 62 and 64 associated with the security device 44 in one of several ways.

One way to send the distress signal and trigger the visual and/or audible indicators 62 and 64 is through the user interface 86 of the application 84A. In the illustrated example, the user interface 86 includes a panic button 92 that causes the mobile device 46 to send the distress signal to the security device 44 through either the direct wireless connection 56 or the network wireless connection 54 to a wireless communications device 45 in the security device 44. Once the security device 44 has received the distress signal, the security device 44 will trigger the visual and/or audible indicators 62 and 64 to alert others that the user 48 is in need of help.

Another way to send the distress signal and trigger the visual and/or audible indicators 62 and 64 is through a rapid movement 94 of the mobile device 46 by the user 48 that could indicate that the user 48 is in need of help. The rapid movement is measured by at least one accelerometer 96 in the mobile device 46. The application 84A for the lockbox security system 30 is capable of interfacing with the accelerometer 96 to determine if the mobile device 46 was subjected to rapid movements indicative of the user 48 being in need of help.

Once the application 84A for the lockbox security system 30 receives accelerometer data that is indicative of a distress situation for the user 48, the mobile device 46 sends the distress signal to the security device 44 through either the direct wireless connection 56 or the network wireless connection 54. Upon receipt of the distress signal by the security device 44, the security device 44 triggers the visual and/or audible indicators 62 and 64 to alert others that the user 48 is in need of help.

Yet another way to trigger the visual and/or audible indicators 62 and 64 is through requiring the user 48 to periodically check-in with the application 84A for the lockbox security system 30. The periodic check-in by the user 48 can occur through the user 48 selecting a check-in button 98 on the user interface 86. If the user has not checked-in within a predetermined length of time, the mobile device 46 sends the distress signal to the security device 44 through either the direct wireless connection 56 or the network wireless connection 54. Upon receipt of the distress signal by the security device 44, the security device 44 triggers the visual and/or audible indicators 62 and 64 to alert others that the user 48 is in need of help.

A further way to trigger the visual and/or audible indicators 62 and 64 is through voice recognition on the mobile device 46. For a predetermined time period after the agent removes the key 41 from the lockbox 34, the mobile device 46 uses voice recognition software stored in memory of the mobile device 46 to recognize the presence or absence of predetermined words or phrases. The predetermined words or phrases are supplied from audio data received by the mobile device 46 and indicate that the user 48 is in need of help.

Figure 4:
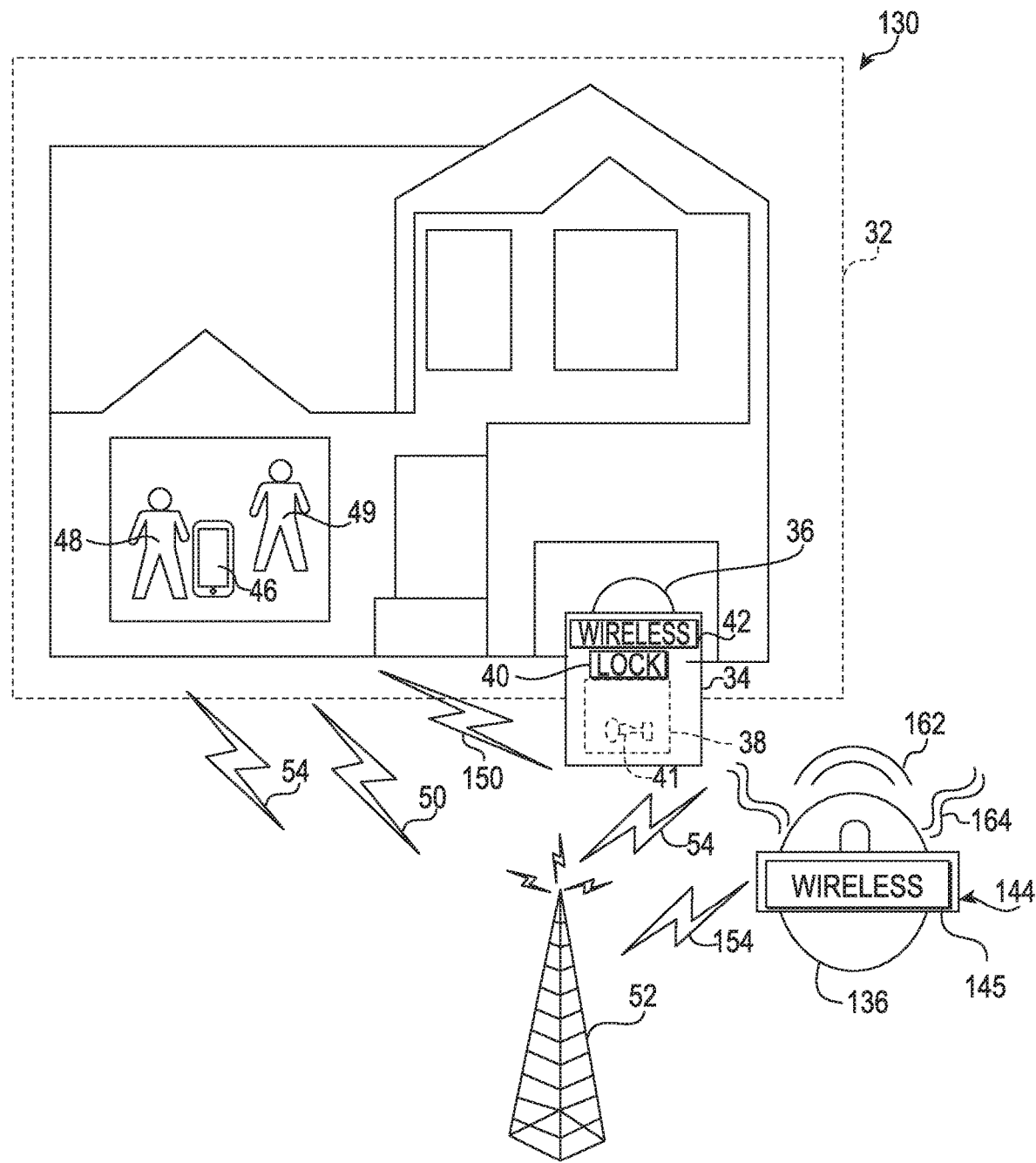
FIG. 4 illustrates another example lockbox security system.

FIG. 4 illustrates a non-limiting example of another lockbox security system 130. The lockbox security system 130 is similar to the lockbox security system 30 except where described below or shown in the Figures. Like number will be used between the lockbox security system 30 and lockbox security system with the addition of a leading 1.

Unlike the lockbox security system 30, the lockbox security system 130 includes a security device 144 that is separate from the vehicle 58. This allows the security device 144 to be used in situations where it isn't feasible to have the vehicle 58 in the vicinity of the premises 32 or where the user 48 would like to easily transport the security device 144 between remote premises 32 without the use of a vehicle.

The lockbox security system 130 can be used with the same lockbox 34 as described above with reference to the lockbox security system 30 in FIG. 1. The security device 144 includes a locking mechanism 136 to secure the security device 144 to an object on the premises 32 or in close proximity to the premises 32. The security device 144 may even be secured to the same object as the lockbox 34. The security device 144 also includes a wireless communication device 145 that is capable of communicating wireless with the mobile device 46 and the lockbox 34.

The connection between the wireless communication device 145 in the security device 144 and the mobile device 46 can be through a direct wireless connection 150, such as through forming a Bluetooth connection with the mobile device 46. Alternatively, the wireless communication device 145 connects with the mobile device 46 through a network connection, such as a cellular network, as described above. When a network connection is used, the wireless communication device 145 and the mobile device 46 communicate through the wireless service network 52 with wireless connections 54 and 154.

In the illustrated example of FIG. 4, the security device 144 is locked relative to the premises 32 via the locking mechanism 136. The security device 144 includes a microprocessor and memory for storing and running a distress program that is capable of triggering at least one visual indicator 162 and/or at least one audible indicator 164 when the security device 144 receives the distress signal from the mobile device 46. The visual indicators 162 can include at least one of constant or flashing light and the audible indicator 164 can include a loud noise, such as a siren. The mobile device 46 determines when to send the distress signal to the security device 144 is the same manner as described above with respect to the security device 44.

Figure 5:
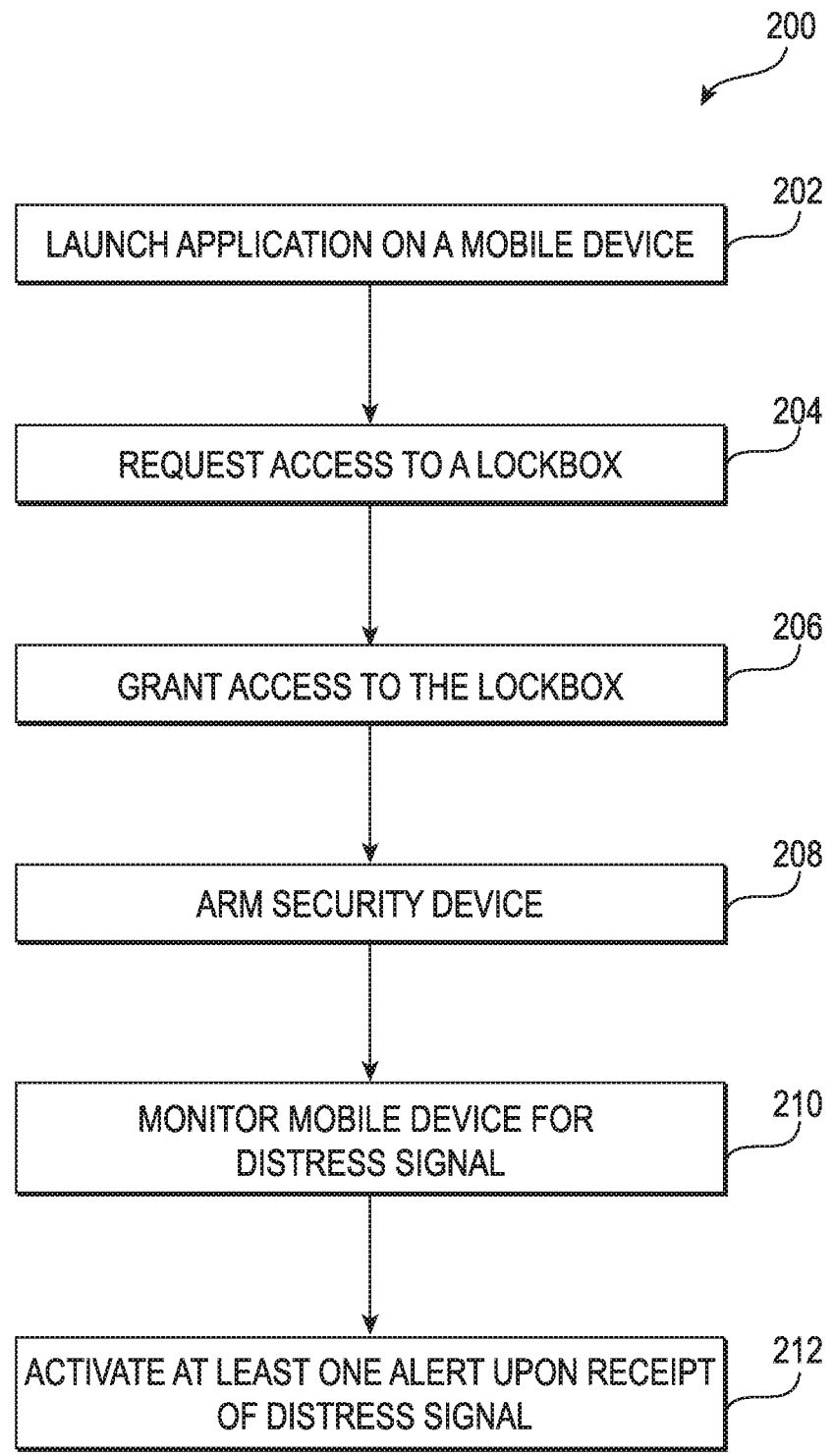
FIG. 5 illustrates a method of operating a smart lock door system.

FIG. 5 schematically illustrates a method 200 of operating the lockbox security systems 30 and 130. Initially, the user 48 launches the lockbox application 84A on the mobile device 46 (Block 202). When the application 84A has been launched, the user 48 can then request access to the lockbox 34 through pressing the access button 88 in the application 84A on the mobile device 46 (Block 204). Once access is granted, the lock mechanism 40 activates and provides access to the locked compartment 38 in the lockbox 34 where the key 41 is located for accessing the premises 32 (Block 206).

The application 84A can then automatically arm the security device 44, 144 or the user 48 can manually arm the security device 44, 144 (Block 208). The security device 44, 144 then monitors for the distress signal sent from the mobile device 46 that would indicate that the user 48 is in need of help (Block 210). Upon receipt of the distress signal from the mobile device 46, the security device 44, 144 activates the visual indicator 62, 162 and/or the audible indicator 64, 164, respectively, to alerts other surrounding the premises 32 that the user 48 is in need of help (Block 212).

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A lockbox security system comprising:
   a lockbox having a lockable compartment, wherein the lockbox includes a wireless communications device and a stored program configured to provide access to the lockable compartment in response to a wireless signal; and
   a security device including a wireless security communication device and a stored distress program configured to activate an alert comprising at least one visual indicator and/or at least one audible indicator upon receipt of a distress signal, wherein the security device is located at or on a premises associated with the lockbox and the at least one visual indicator and/or at least one audible indicator is issued at or on the premises.

2. The lockbox security system of claim 1, wherein the wireless communications device includes at least one of a cellular communicator or a Bluetooth communicator.

3. The lockbox security system of claim 2, wherein the wireless security communication device includes at least one of a cellular communicator or a Bluetooth communicator.

4. A lockbox security system comprising:
   a lockbox having a lockable compartment, wherein the lockbox includes a wireless communications device and a stored program configured to provide access to the lockable compartment in response to a wireless signal; and
   a security device including a wireless security communication device and a stored distress program configured to activate an alert upon receipt of a distress signal, wherein the security device is configured to interface with a vehicle.

5. The lockbox security system of claim 4, wherein the security device includes an on-board diagnostic (OBD) port compatible connector.

6. The lockbox security system of claim 4, wherein the security device is configured to activate at least one of a vehicle horn or a vehicle light.

7. The lockbox security system of claim 1, wherein the security device is remote from the lockbox.

8. The lockbox security system of claim 7, wherein the security device includes at least one of an audible alarm or a visual alarm.

9. The lockbox security system of claim 8, wherein the security device includes a lockable attachment for securing the security device.

10. The lockbox security system of claim 1, further comprising a mobile device configured to wirelessly communicate with the lockbox and the security device, and wherein the distress signal is generated and the at least one visual indicator and/or the at least one audible indicator are triggered by at least one of:
 a user input to a user interface of an application associated with the mobile device;
 rapid movement of the mobile device measured by at least one accelerometer in the mobile device exceeding a predetermined limit; or
 a user failing to check in with the application within a predetermined length of time;
 the mobile device using voice recognition to recognize a presence or absence of predetermined words or phrases.

11. A method of operating a lockbox security system comprising the steps of:
 wirelessly communicating access to a lockbox from a mobile device;
 locating a security device at or on a premises associated with the lockbox;
 activating the security device upon granting access to the lockbox; and
 communicating a distress signal from the mobile device wirelessly to the security device, wherein the security device activates an alarm comprising at least one visual indicator and/or at least one audible indicator upon receipt of the distress signal, and wherein the alarm is issued at or on the premises.

12. The method of claim 11, wherein wirelessly communicating access to the lockbox from the mobile device is performed through at least one of a cellular connection or a a Bluetooth connection.

13. The method of claim 11, wherein the distress signal is sent from the mobile device to the security device through at least one of a cellular connection or a Bluetooth connection, and wherein the distress signal is generated and the at least one visual indicator and/or the at least one audible indicator are triggered by at least one of:
 a user input to a user interface of an application associated with the mobile device;
 rapid movement of the mobile device measured by at least one accelerometer in the mobile device exceeding a predetermined limit; or
 a user failing to check in with the application within a predetermined length of time; or
 the mobile device using voice recognition to recognize a presence or absence of predetermined words or phrases.

14. The method of claim 11, wherein the security device is remote from the lockbox.

15. A method of operating a lockbox security system comprising the steps of:
 wirelessly communicating access to a lockbox from a mobile device;
 activating a security device upon granting access to the lockbox, wherein the security device is remote from the lockbox; and
 communicating a distress signal from the mobile device wirelessly to the security device, wherein the security device activates an alarm upon receipt of the distress signal, wherein the security device is in direct electrical communication with a vehicle.

16. The method of claim 15, wherein the alarm includes at least one of a vehicle a horn or a vehicle light.

17. The method of claim 11, wherein the mobile device sends the distress signal in response to one of a predetermined movement of the mobile device or a predetermined audio input recognized by the mobile device.

18. The method of claim 17, wherein the predetermined movement of the mobile device is identified through accelerometer data from the mobile device and the predetermined a audio input is identified through audio data from the mobile device.

19. The method of claim 11, wherein the mobile device sends the distress signal in response to a user sending a distress signal from the mobile device.

20. The method of claim 11, including attaching the security device to an object on the premises.

21. The method of claim 20, wherein the object includes the at least a one visual indicator and/or at least one audible indicator.

22. The lockbox security system of claim 1, wherein the security a device is attached to an object on the premises with at least one locking mechanism.

23. The lockbox security system of claim 22, wherein the object includes the at least one visual indicator and/or at least one audible indicator.

24. The method of claim 20, wherein the object comprises a car.

25. The lockbox security system of claim 22, wherein the object comprises a car.

\* \* \* \* \*